United States Patent
Lin et al.

(10) Patent No.: US 7,551,133 B2
(45) Date of Patent: Jun. 23, 2009

(54) GPS NAVIGATION USING INTERACTING MULTIPLE MODEL (IMM) ESTIMATOR AND PROBABILISTIC DATA ASSOCIATION FILTER (PDAF)

(75) Inventors: Xiangdong Lin, Irvine, CA (US);
Gengsheng Zhang, Cupertino, CA (US);
Mangesh Chansarkar, Irvine, CA (US);
Daniel Liao, Irvine, CA (US); Lionel Garin, Palo Alto, CA (US)

(73) Assignee: SiRF Technology, Inc., San Jose, CA (US)

( * ) Notice: Subject to any disclaimer, the term of this patent is extended or adjusted under 35 U.S.C. 154(b) by 27 days.

(21) Appl. No.: 11/696,920

(22) Filed: Apr. 5, 2007

(65) Prior Publication Data

US 2008/0246653 A1     Oct. 9, 2008

(51) Int. Cl.
*G01S 5/14* (2006.01)
*G01C 21/00* (2006.01)
(52) U.S. Cl. .................... 342/357.12; 701/213
(58) Field of Classification Search ........... 342/357.12; 701/213, 214
See application file for complete search history.

(56) References Cited

U.S. PATENT DOCUMENTS

| | | | |
|---|---|---|---|
| 6,609,080 B1 * | 8/2003 | Syrjärinne | 702/150 |
| 7,030,809 B2 * | 4/2006 | McCabe et al. | 342/195 |
| 7,079,991 B2 * | 7/2006 | Li et al. | 703/2 |
| 7,356,096 B2 * | 4/2008 | Reid | 375/340 |

OTHER PUBLICATIONS

Lin, Xiangdong et al, "Enhanced Accuracy GPS Navigation Using the Interacting Multiple Model Estimator," 2001 IEEE Proc Aerospace Conference, Mar. 2001, pp. 4/1911-4/1923.*

* cited by examiner

*Primary Examiner*—Gregory C Issing
(74) *Attorney, Agent, or Firm*—Haynes & Boone, LLP.

(57) ABSTRACT

A method for GPS navigation which uses an interacting multiple-model (IMM) estimator with a probabilistic data association filter (PDAF) improves navigation performance. The method includes (a) providing two or more models of GPS navigation, with each model characterized by a model state vector which is updated periodically, (b) providing for each model a corresponding filter for deriving, for each period, a current value for the corresponding model state vector based on current measurements made on parameters affecting the corresponding state vector; and (c) applying an interacting multiple model (IMM) estimator to provide, for each period, a current value for a system state vector using the current values of the model state vectors for that period and their corresponding filters. Each model state vector may include one or more of the following: variables: 3-dimensional position, 3-dimensional velocity, satellite clock bias, satellite clock drifts and one or more other satellite parameters. The current value of the system state vector may be a weighted average of the current values of the model state vectors, where the weights are a set of mode probabilities. In addition, one or more of the filters is a probabilitic data association filter (PDAF).

16 Claims, 3 Drawing Sheets

GPS NAVIGATION USING INTERACTING MULTIPLE MODEL (IMM) ESTIMATOR AND PROBABILISTIC DATA ASSOCIATION FILTER (PDAF)

BACKGROUND OF THE INVENTION

1. Field of the Invention

The present invention relates to processing of global positioning systems (GPS) signals. In particular, the present invention relates to processing GPS signals in the presence of dynamically changing, false observations and multipath signal interference.

2. Discussion of the Related Art

Conventional GPS navigation may use a Kalman filter to improve accuracy in position determination using pseudorange and other measurements. This approach is based on a single mathematical model of the GPS receiver and its environment. Often, such a model assumes both a relatively constant velocity for the GPS receiver, and a static measurement environment. In practice, such assumptions are often found to be invalid. For example, the GPS receiver may be moving at constant velocity only for very limited time periods, with time periods of acceleration and deceleration in between. A GPS receiver also often changes its direction of travel. The appropriate model for each of these circumstances may be different. Transitions from one model to another model are also important. Thus, navigation based on a single Kalman filter is at best a compromise, and results in poor navigation performance.

In conventional GPS processing, multipath effects (i.e., the super-positioning of the direct line-of-sight signal path and indirect signal paths) are often present, especially in an urban canyon environment. From the Kalman's filter point of view, multipath effects affect the statistics in the measurement environment, thereby changes measurement accuracy (e.g., increasing measurement noise variance). Multi-path effects are typically time-varying, intermitten and random. In such an environment, a static multipath model is inappropriate. In the presence of multipath effects, the measurement error is likely positively biased, with an increased variance relative to the case in which multipath effects are not present. A Kalman filter designed for an environment without multipath effects does not perform well in the presence of multipath effects.

Further, multipath effects and other acquisition errors often cause severe noise in the measured GPS parameters, rendering such measurements unsuitable for use in the Kalman filter. These invalid measurements may lead to very large navigation error, thus significantly degrading the Kalman filter's performance. A complicated filtering of the measured parameters and noise-rejection before the measurements can be used in a Kalman filter. However, proper criteria for accepting or rejecting the measurements are not always clear or known, so that a proper measurement may be improperly rejected, and a false measurement may be improperly accepted. Even with good acceptance and rejection criteria, different weights should be given to navigation data under different collection conditions. For example, one measurement found barely acceptable should not be given the same weight as a measurement found well within the region of acceptance.

SUMMARY OF THE INVENTION

According to one embodiment of the present invention, a method for GPS navigation which uses an interacting multiple-model (IMM) estimator with a probabilistic data association filter (PDAF) improves navigation performance.

In one embodiment of the present invention, the method includes (a) providing two or more models of GPS navigation, with each model characterized by a model state vector which is updated periodically, (b) providing for each model a corresponding filter for deriving, for each period, a current value for the corresponding model state vector based on current measurements made on parameters affecting the corresponding state vector; and (c) applying an interacting multiple model (IMM) estimator to provide, for each period, a current value for a system state vector using the current values of the model state vectors for that period and their corresponding filters. Each model state vector may include one or more of the following: variables: 3-dimensional position, 3-dimensional velocity, clock bias, clock drifts and one or more other satellite parameters. The current value of the system state vector may be a weighted average of the current values of the model state vectors, where the weights are a set of mode probabilities.

According to one embodiment of the present invention, the IMM estimator calculates mixing probabilities for each model based on previous measurements made on the parameters. In each cycle, prior to deriving the current values of the model state vectors in the filters, the IMM estimator uses the mixing probabilities to calculate an initial value for each model state vector by weighting the current model state vectors of the immediately previous cycle. Using the current values of the model state vectors derived by the filters, the IMM estimator calculates the mixing probabilities for use in the next cycle, and the mode probabilities for providing the current value of the system state vector.

According to another aspect of the present invention, one or more of the filters is a probabilitic data association filter (PDAF). The PDAF provides (i) a predicted value for the corresponding model state vector based on internal parameters of the model, and (ii) the current value of the model state vector by updating the predicted value of the model state vector, based on the current measurements made. The PDAF may also apply a statistical difference between a correct observation and a false observation to the current measurements made to derive the current value of the model state vector. The statistical difference may be expressed by a first probability density function for a correct observation, and a second probability density function for a false observation. The probability density functions may include a function of a distance in standard deviations between one of the current measurements and its nominal value. Alternatively, the probability density functions may each be a function of a measured value for the parameters affecting the model state vector. Possible probability density functions for correct observation include a Gaussian distribution, a Rayleigh distribution or an exponential distribution. Other possible probability density functions include a uniform distribution, a linear distribution, an exponential distribution, or a combination of a uniform distribution and a linear distribution.

The present invention is applicable to models pertaining to multipath effects, environments with low signal-to-noise ratios, a GPS receiver moving at constant velocity, or a GPS receiver having motions that involve non-constant velocities (e.g., acceleration, deceleration, or making turns).

The present invention is better understood upon consideration of the detailed description below in conjunction with the accompanying drawings.

DETAILED DESCRIPTION OF THE PREFERRED EMBODIMENTS

An interacting multiple-model (IMM) estimator uses several filters, rather than a single Kalman filter. According to one embodiment, an IMM estimator may be designed specifically for specific navigation circumstances. The final output of an IMM estimator is statistically combined from the output data of the multiple filters. In an IMM estimator, information may be exchanged between different filters, weights for the component filters may be dynamically calculated, giving appropriate weights to the component filters according to the prevailing navigation circumstances. Therefore, the final output of an IMM follows the best model. For each component filter of an IMM estimator, a probabilistic data association filter (PDAF) may be used, in place of a single Kalman filter. The PDAF is an extension of a standard Kalman filter, with the ability to handle false or multiple observations probabilistically.

Figure 1:
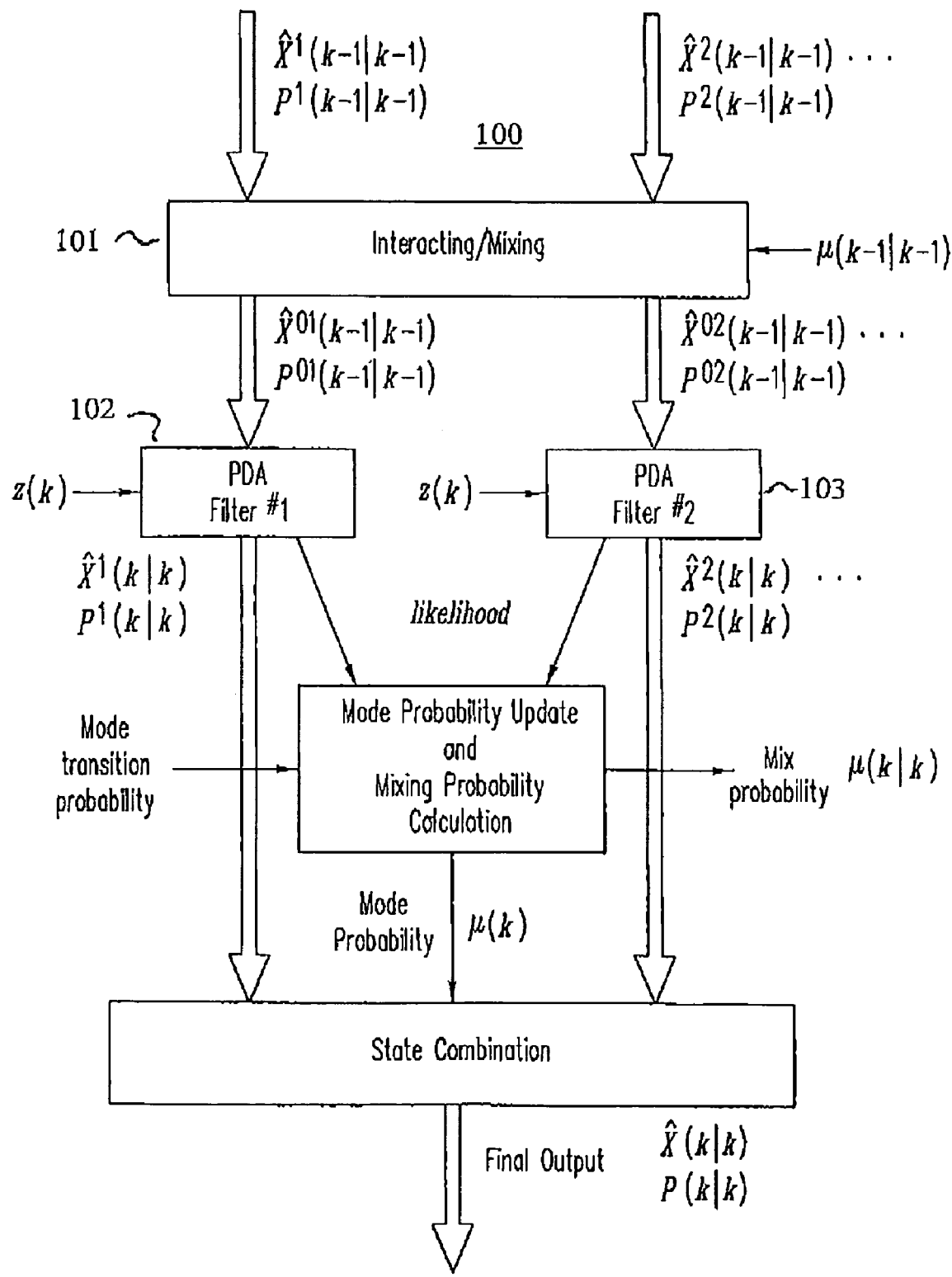
FIG. 1 shows an IMM estimator with a PDAF (i.e., IMM-PDAF 100), according to one embodiment of the present invention.

FIG. 1 shows an IMM estimator with a PDAF (i.e., IMM-PDAF 100), according to one embodiment of the present invention. As shown in FIG. 1, IMM-PDAF 100 includes an interacting/mixing filter 101, which receives updated state vectors $\hat{X}^1(k-1|k-1)$ and $\hat{X}^2(k-1|k-1)$ at time k-1 for models $M^1$ and $M^2$ respectively, together with corresponding error variance $P^1(k-1|k-1)$ and $P^2(k-1|k-1)$. In a GPS application, for example, state vectors $\hat{X}^1$ and $\hat{X}^2$ may each be a state vector having elements representing, 3-dimensional position, 3-dimensional velocity, clock bias, clock drifts and other satellite parameters:

$$\hat{X} = [x\ \dot{x}\ y\ \dot{y}\ z\ \dot{z}\ c\Delta t\ c\Delta \dot{t}\ SV_{bias1} \ldots SV_{biasN}]^T$$

Models $M^1$ and $M^2$ may be, for example, models where multi-path effects dominate, or models where low signal-to-noise ratio (SNR) conditions dominate, respectively.

Interacting/mixing filter 101 receives also mixing probabilities $\mu_{i|j}(k-1|k-1)$ to provide mixing initial conditions $\hat{X}^{01}(k-1|k-1)$ and $\hat{X}^{02}(k-1|k-1)$. Mixing probabilities $\mu_{i|j}(k-1|k-1)$ represent the probabilities that model $M^j$ was in effect at time k-1 given that model $M^i$ is in effect at time k and measurements z(k-1) were observed up to time k-1.

In one embodiment, mixing probabilities $\mu_{i|j}(k-1|k-1)$ may be obtained from mode probabilities $\mu_i(k-1)$ and mode transition probabilities $p_{ij}$:

$$\mu_{i|j}(k-1|k-1) = \frac{1}{\bar{c}_j} p_{ij}\mu_i(k-1)$$

where $$\bar{c} = \sum_{i=1}^{r} p_{ij}\mu_i(k-1)$$

is the normalizing factor for the r models.

The mixing initial conditions $\hat{X}^{01}(k-1|k-1)$ and $\hat{X}^{02}(k-1|k-1)$ are fed respectively into probability data association filters (PDAF) 102 and 103 representing models $M^1$ and $M^2$, each receiving measurements z(k) observed up to time k. PDAFs 102 and 103 may each be, for example, a Kalman filter-like filter, providing for time k updated state vectors $\hat{X}^1(k|k)$ and $\hat{X}^2(k|k)$, and corresponding error variance $P^1(k|k)$ and $P^2(k|k)$, respectively. In addition, PDAFs 102 and 103 provide likelihood functions $\Lambda^1$ and $\Lambda^2$. Likelihood function $\Lambda^j$ representing the conditional probabilities for observing measurements z(k) up to time k, given model $M^j$ is in effect at time k and measurements z(k-1) up to time k-1.

The likelihood functions are used to derive the mode probabilities $\mu_i(k-1)$ and the mixing probabilities $\mu_{i|j}(k-1|k-1)$. In one embodiment, mode probabilities $\mu_i(k-1)$ are given by:

$$\mu_i(k) = \frac{1}{c}\Lambda^i(k)\bar{c}$$

where $$c = \sum_{i=1}^{r} \Lambda^i(k)\bar{c}$$

is a normalization factor.

The updated combined state vector $\hat{X}(k|k)$ at time k and its corresponding error variance $P(k|k)$ are output. Note that updated combined state vector $\hat{X}(k|k)$ and its corresponding error variance $P(k|k)$ are not used in the recursive algorithm. In one embodiment, the combined state vector $\hat{X}(k|k)$ at time k its corresponding error variance $P(k|k)$ may be given by:

$$\hat{X}(k|k) = \sum_{j=1}^{r} \hat{X}^j(k|k)\mu_j(k)$$

$$P(k|k) = \sum_{j=1}^{r} \mu_j(k)\left[P^j(k|k) + [\hat{X}^j(k|k) - \hat{X}(k|k)] * [\hat{X}^j(k|k) - \hat{X}(k|k)]^T\right]$$

PDAFs 102 and 103 may each have the following prediction equations for the state vector, the associated error covariance $P^{0j}$, a measurement estimate and the innovation covariance, respectively, as in a standard Kalman filter:

$$\hat{X}^{0j}(k|k-1)=F^j(k)\hat{X}^{0j}(k-1|k-1)$$

$$P^{0j}(k|k-1)=F^j(k)P^{0j}(k-1|k-1)F^j(k)^T+Q^j(k-1)$$

$$\hat{z}(k|k-1)=H^j(k)\hat{X}^{0j}(k|k-1)$$

$$S^j(k)=H^j(k)P^{0j}(k|k-1)H^j(k)^T+R^j(k)$$

where $F^j$, $Q^j$, $H^j$, and $R^j$ are the state transition model, the noise covariance matrix, the measurement model, and the residue covariance matrix for model $M^j$, respectively.

The updated state vectors $\hat{X}^j(k|k)$ and its error covariance $P^j(k|k)$ for model $M^j$ may be obtained using measurement $z(k)$ according to the following updating equations:

$$\hat{X}^j(k|k)=\hat{X}^{0j}(k-k-1)+W^j(k)[z(k)-\hat{z}(k|k-1)]$$

$$P^j(k|k)=P^{0j}(k|k-1)-W^j(k)S^j(k)W^j(k)^T$$

where $W^j$ is the gain of the filter. Filter gain $W^j$ may be given by:

$$W^j(k)=P^{0j}(k|k-1)H^j(k)^T[S^j(k)]^{-1}$$

Figure 2:
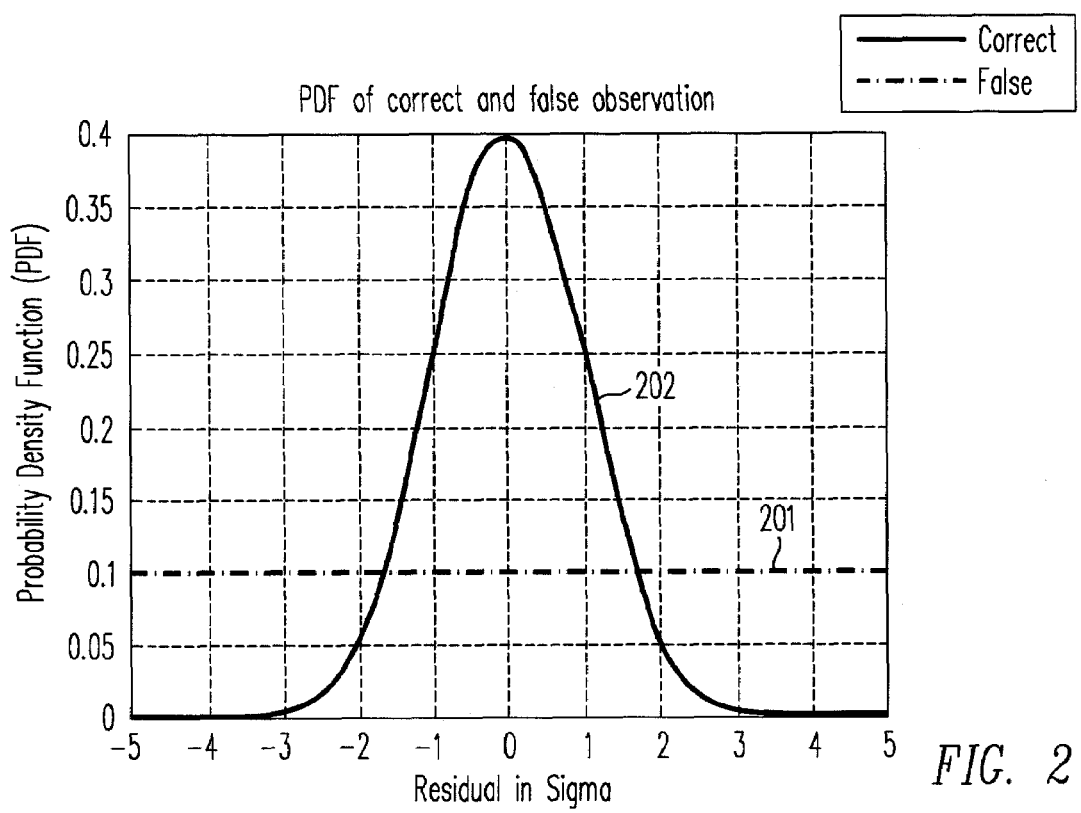
FIG. 2 shows a Gaussian probability density function 202, suitable for modeling correct observations, and a uniform probability density function 201, suitable for modeling false observations, according to one embodiment of the present invention.

The algorithm described above may be used to probabilistically distinguish between a correct observation and a false observation, using the different statistical characteristics between the two types of observations. For example, correct observations may be modeled by a Gaussian probability density function, while false observations may be better modeled by a uniform distribution. FIG. 2 shows a Gaussian probability density function 202, suitable for modeling correct observations, and a uniform probability density function 201, suitable for modeling false observations. Each PDAF makes "soft" decisions, rather than black-and-white "hard" decision. A reasonable soft decision takes advantage of more information, as a hard decision is merely a special case of a soft decision.

In one embodiment, false or invalid measurements are represented by uniform distribution 201 of FIG. 2, and correct or valid measurements are represented by Gaussian distribution 202, respectively. In that embodiment, the residual of observation exceeds a predetermined value of the innovation variance (e.g., five standard deviations, or "5-sigma"), the probability that the observation is invalid is assigned the probability of 1. That is, $$[z(k)-z(k|k-1)]^T S(k)^{-1}[z(k)-z(k|k-1)]\leq\gamma$$

where $\gamma$ is the gate threshold (for 5-sigma, $\gamma$ is 25).

The probability density function (PDF) for a correct observation is given by:

$$P_D P_G^{-1} N[z(k)|z(k|k-1),S(k)]=P_D P_G^{-1} N[z(k)-z(k|k-1)|0,S(k)]$$

where $P_D$ is the probability of detection, $P_G^{-1}$ is the normalization factor to make the Gaussian PDF unity in the validation area.

Similarly, because an invalid observation is assumed to have a uniform distribution[1], the PDF is given by:

[1] In other embodiments, other PDFs may be used $$(1-P_D)\frac{1}{2|\gamma S(k)|^{1/2}}$$

Therefore, the association probabilities $\beta_1(k)$ and $\beta_0(k)$ are the probabilities that an observation is valid or invalid, respectively. According to the Total Probability Theorem, association probabilities $\beta_1(k)$ and $\beta_0(k)$ are given by:

$$\beta_1(k)=\frac{P_D P_G^{-1}\frac{1}{|2\pi S(k)|^{1/2}}e^{-\frac{1}{2}v(k)'S(k)^{-1}v(k)}}{(1-P_D)\frac{1}{2|\gamma S(k)|^{1/2}}+P_D P_G^{-1}\frac{1}{|2\pi S(k)|^{1/2}}e^{-\frac{1}{2}v(k)'S(k)^{-1}v(k)}}$$

$$=\frac{e^{-\frac{1}{2}v(k)'S(k)^{-1}v(k)}}{\left(\frac{2\pi}{\gamma}\right)^{\frac{1}{2}}\frac{1}{2}\frac{(1-P_D)P_G^{-1}}{P_D}+e^{-\frac{1}{2}v(k)'S(k)^{-1}v(k)}}$$

$$\beta_0(k)=\frac{\left(\frac{2\pi}{\gamma}\right)^{\frac{1}{2}}\frac{1}{2}\frac{(1-P_D)P_G^{-1}}{P_D}}{\left(\frac{2\pi}{\gamma}\right)^{\frac{1}{2}}\frac{1}{2}\frac{(1-P_D)P_G^{-1}}{P_D}+e^{-\frac{1}{2}v(k)'S(k)^{-1}v(k)}}$$

Or $$\beta_i(k)=\begin{cases}\frac{b}{b+e_1} & i=0,\text{ invalid observation}\\ \frac{e_1}{b+e_1} & i=1,\text{ valid observation}\end{cases}$$

where $$e_1=e^{-\frac{1}{2}v(k)'S(k)^{-1}v(k)}$$

$$b=\left(\frac{2\pi}{\gamma}\right)^{\frac{1}{2}}\frac{1}{2}\frac{(1-P_D)P_G^{-1}}{P_D}$$

Consequently, the output state vector for model $M^i$ is given by:

$$\hat{X}^i(k|k)=\sum_{j=0}^{1}\hat{X}_j^i(k|k)\beta_j(k)$$

For a false observation, the state vector is not updated:

$$\hat{X}_0^i(k|k)=\hat{X}^{0i}(k|k-1)$$

For a valid observation, the state vector is updated in the same manner as a Kalman filter:

$$\hat{X}_1^i(k|k)=\hat{X}^{0i}(k|k-1)+W(k)[z(k)-z(k|k-1)]$$

where gain $W(k)$ is given by:

$$W(k)=P^{02}(k|k-1)H(k)^T S(k)^{-1}, \text{ as in a Kalman filter.}$$

Therefore updated state vector $\hat{X}^i(k|k)$ and error variance $P^i(k|k)$ are given by:

$$\hat{X}^i(k|k)=\hat{X}^{0i}(k|k-1)+W(k)\beta_1(k)[z(k)-z(k|k-1)]$$

$$P^i(k|k)=\beta_0(k)P^i(k|k-1)+(1-\beta_0(k))P^c(k|k)+\tilde{P}(k)$$

where $$P^c(k|k)=P^{0i}(k|k-1)-W(k)S(k)W(k)^T$$

$$\tilde{P}(k)=W(k)[\beta_1(k)v(k)v(k)^T-\beta_1(k)v(k)v(k)^T\beta_1(k)]W(k)^T$$

Overall, the PDAF is very similar to the standard Kalman filter. The PDAF is very simple, easy to understand, and also very computational efficient, with about 50% than a Kalman filter. Note that the PDAF algorithm can also handle multiple observations. Assuming there are m observations in the validation region. The conventional Kalman filter can only choose one as the correct measurement, while the PDAF can probabilistically associate all measurements to the filter.

Besides this, the PDAF also considered the probability that all these m observations are false (i.e., the PDAF handles m+1 hypotheses). In this case, the following equations may be used for model $M^i$:

$$\hat{X}^i(k|k) = \hat{X}^i(k|k-1) + W(k)v(k)$$

$$v(k) = \sum_{i=1}^{m} \beta_i(k)[z_i(k) - z(k|k-1)]$$

$$\tilde{P}(k) = W(k)\left[\sum_{i=1}^{m}[\beta_i(k)v_i(k-1)v_i(k-1)^T - v(k-1)v(k-1)^T]\right]W(k)^T$$

$$\beta_i(k) = \begin{cases} \dfrac{e_i}{b + \sum_{i=1}^{m} e_i} & i = 1, 2, \ldots m \\ \dfrac{b}{b + \sum_{i=1}^{m} e_i} & i = 0, \text{false} \end{cases}$$

In this multiple observation case (or other very low SNR scenarios), the PDAF algorithm out-performs the Kalman filter significantly. In one embodiment, six observations were made, so that seven hypotheses were tested (i.e., one of the six observations are correct or all of the observations are false). Assuming that the probability density function of a correct measurement is provided by a Gaussian distribution, and assuming that, when the residual of observation exceeds a predetermined value of the innovation variance (e.g., five standard deviations, or "5-sigma"), the probability that the observation is invalid is assigned the probability of 1. That is, $$[z(k)-z(k|k-1)]^T S(k)^{-1}[z(k)-z(k|k-1)] \leq \gamma$$

where $\gamma$ is the gate threshold (for 5-sigma, $\gamma$ is 25).

The probability density function (PDF) for a correct observation is given by:

$$P_D P_G P_G^{-1} N[z(k)|z(k|k-1),S(k)] = P_D P_G P_G^{-1} N[z(k)-z(k|k-1)|0,S(k)]$$

where $P_D$ is the probability of detection, $P_G$ is the Gaussian cumulative distribution function (CDF) within the 5-sigma region, $P_G^{-1}$ is the normalization factor to make the Gaussian PDF unity in the validation area. Let $\sigma \equiv |S(k)|^{1/2}$, the PDF for the correct association for measurement i is given by $$\frac{P_D e^{\frac{-[z_i(k)-z(k|k-1)]^2}{2\sigma^2}}}{\sqrt{2\pi}\,\sigma}$$

Assuming that an invalid observation has a uniform distribution[2], the PDF for a false observation is given by:

[2] In other embodiments, other PDFs may be used $$(1 - P_D P_G)\frac{1}{2|\gamma S(k)|^{1/2}} = \frac{(1 - P_D P_G)}{10\sigma}$$

Therefore, the association probabilities $\beta_i(k)$ and $\beta_0(k)$ are the probabilities that that $i^{th}$ observation is valid and none of the observations are valid, respectively. According to the Total Probability Theorem, association probabilities $\beta_2(k)$ and $\beta_1(k)$ are given by:

$$\beta_i(k) = \frac{\dfrac{P_D e^{\frac{-[z_i(k)-z(k|k-1)]^2}{2\sigma^2}}}{\sqrt{2\pi}\,\sigma}\left[\dfrac{1}{10\sigma}\right]^5}{(1 - P_D P_G)\left[\dfrac{1}{10\sigma}\right]^6 + \sum_{j=1}^{6}\dfrac{P_D e^{\frac{-[z_j(k)-z(k|k-1)]^2}{2\sigma^2}}}{\sqrt{2\pi}\,\sigma}\left[\dfrac{1}{10\sigma}\right]^5}$$

$$= \frac{e^{\frac{-[z_i(k)-z(k|k-1)]^2}{2\sigma^2}}}{\dfrac{\sqrt{2\pi}}{10}\dfrac{(1 - P_D P_G)}{P_D} + \sum_{j=1}^{6} e^{\frac{-[z_j(k)-z(k|k-1)]^2}{2\sigma^2}}}$$

$$\beta_0(k) = \frac{\dfrac{\sqrt{2\pi}}{10}\dfrac{(1 - P_D P_G)}{P_D}}{\dfrac{\sqrt{2\pi}}{10}\dfrac{(1 - P_D P_G)}{P_D} + \sum_{j=1}^{6} e^{\frac{-[z_j(k)-z(k|k-1)]^2}{2\sigma^2}}}$$

Or $$\beta_i(k) = \begin{cases} \dfrac{e_i}{b + \sum_{i=1}^{m} e_i} & i = 1, 2, \ldots m \\ \dfrac{b}{b + \sum_{i=1}^{m} e_i} & i = 0, \text{false} \end{cases}$$

where $$e_1 = e^{\frac{-[z_i(k)-z(k|k-1)]^2}{2\sigma^2}}$$

$$b = \frac{\sqrt{2\pi}}{10}\frac{(1 - P_D P_G)}{P_D}$$

Of course, the state and covariance updates follow from the general equations discussed above, for model $M^i$:

For a false observation, the state vector is not updated:

$$\hat{X}_0^i(k|k) = \hat{X}^{0i}(k|k-1)$$

If the $j^{th}$ observation is valid, the state vector is updated in the same manner as a Kalman filter:

$$\hat{X}_j^i(k|k) = \hat{X}^{0i}(k|k-1) + W(k)[z(k)-z(k|k-1)]$$

where gain W(k) is given by:

$$W(k) = P^{0i}(k|k-1)H(k)^T S(k)^{-1}, \text{ as in a Kalman filter.}$$

Therefore updated state vector $\hat{X}^i(k|k)$ and error variance $P^i(k|k)$ are given by:

$$\hat{X}^i(k|k) = \hat{X}^{0i}(k|k-1) + W(k)\sum_{j=1}^{6}\beta_j[z(k)-z(k|k-1)]$$

$$P^i(k|k) = \beta_0(k)P^i(k|k-1) + (1 - \beta_0(k))P^c(k|k) + \tilde{P}(k)$$

where $$P^c(k|k) = P^{0i}(k|k-1) - W(k)S(k)W(k)^T$$

$$\tilde{P}(k) = W(k)\left[\sum_{i=1}^{6}[\beta_i(k)v_i(k-1)v_i(k-1)^T - v(k-1)v(k-1)^T]\right]W(k)^T$$

-continued $$v(k) = \sum_{i=1}^{6} \beta_i(k)[z_i(k) - z(k\mid k-1)]$$

Figure 3:
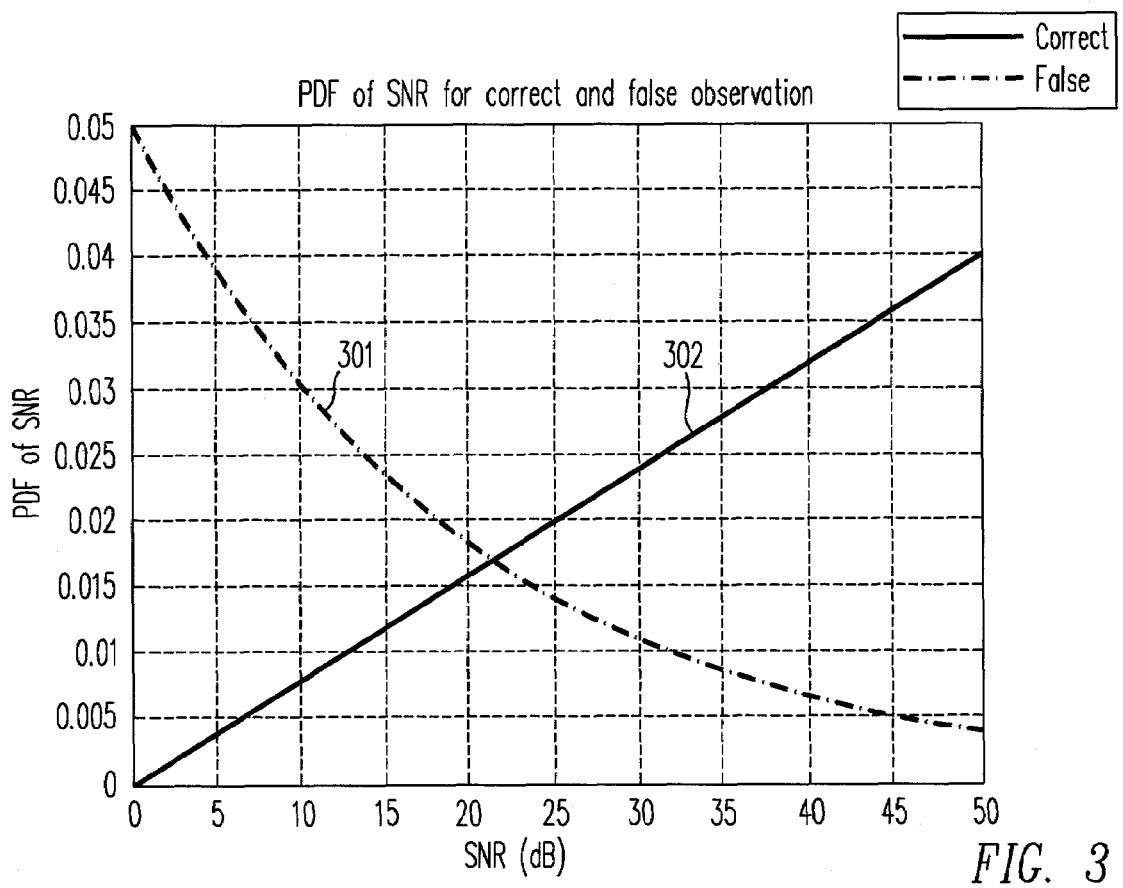
FIG. 3 shows a linear probability density function 302, suitable for modeling amplitudes that are correct observations, and an exponential probability density function 301, suitable for modeling amplitudes of false observations, according to one embodiment of the present invention.

In one embodiment of the present invention, measured SNR information may be used in the PDAF. In that embodiment, the measured amplitude information (CN0 or other amplitude information) can also be used in PDAF. That is, an observed high SNR is more likely come from a correct measurement. There is some statistical difference in the amplitude between correct and false observations. FIG. 3 shows a linear probability density function 302, suitable for modeling amplitudes that are valid observations, and an exponential probability density function 301, suitable for modeling amplitudes of false observations, according to one embodiment of the present invention.

If the measured amplitude is $a_i(k)$, the PDF of the amplitude due to noise may be modeled by a Rayleigh distribution or an exponential distribution (the latter distribution is illustributed by PDF 301 of FIG. 3), $$p_0(a) = \frac{a}{\beta} e^{-\frac{a^2}{2\beta}}, a \geq 0$$

or $$p_0(a) = \frac{a}{\beta} e^{-\frac{a}{\beta}}, a \geq 0$$

However, the PDF of the amplitude of a correct observation may be modeled with Rayleigh distribution or a simple linear between certain ranges (the latter distribution is illustributed by PDF 302 of FIG. 3), $$p_1(a) = \frac{a}{\beta + d} e^{-\frac{a^2}{2(\beta+d)}}, a \geq 0$$

or $$p_1(a) = \frac{2}{L^2} a$$

With the amplitude information, the mode probabilities in PDAF are almost in the same form as described above, with only some minor modifications that incorporate the amplitude information. For general multiple observation case, $$\beta_i(k) = \begin{cases} \dfrac{e_i}{b + \sum_{i=1}^{m} e_i} & i = 1, 2, \ldots m \\ \dfrac{b}{b + \sum_{i=1}^{m} e_i} & i = 0, \text{false} \end{cases}$$

Where $$e_i(k) = e^{-\frac{1}{2} v(k)' S(k)^{-1} v(k)} \frac{p_1(a_i)}{p_0(a_i)}$$

Any other parameter $a_i$ can be associated in the likelihood ratio $$\frac{p_1(a_i)}{p_0(a_i)}$$

to differentiate the correct observation from the false one.

Figure 4:
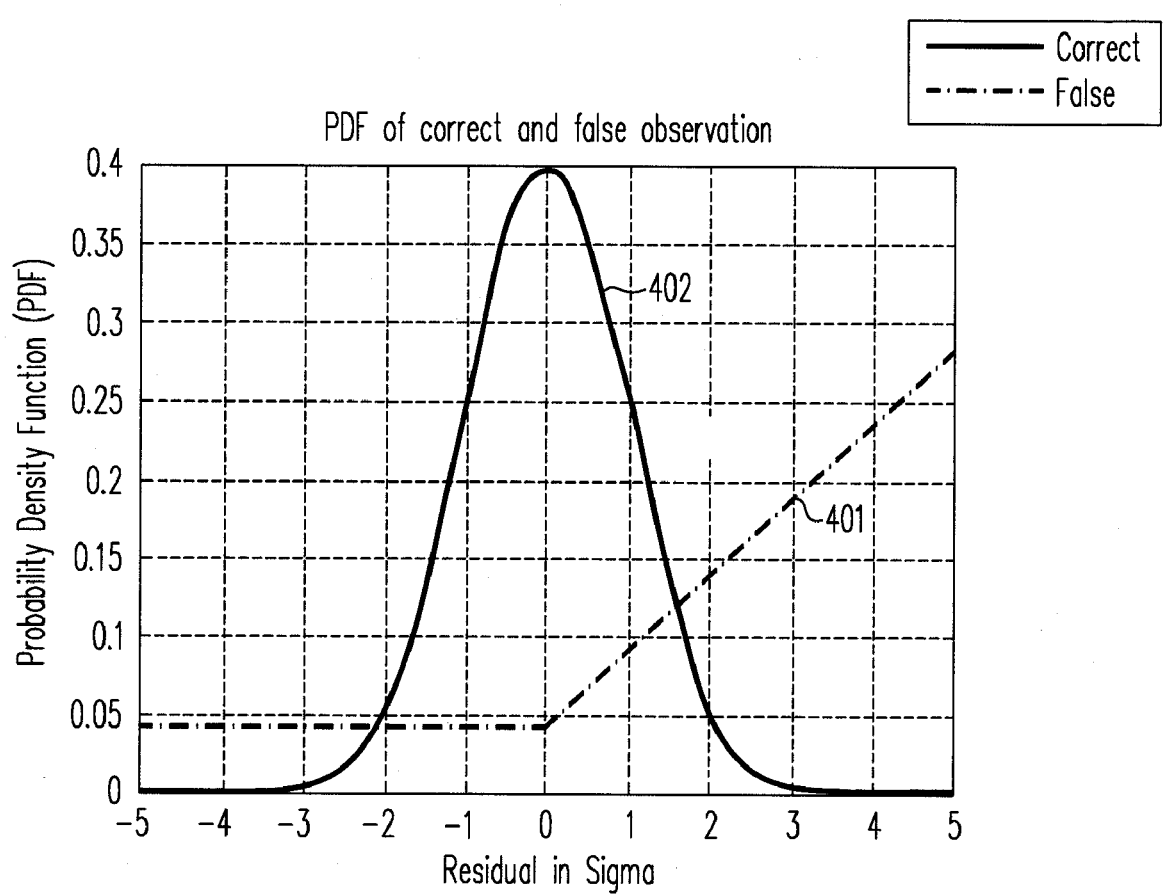
FIG. 4 illustrates PDF 401, which models false observations due to signal multipaths, and Gaussian PDF 402, which models correct observations, according to one embodiment of the present invention.

According to another embodiment of the present invention, false measurements due to multipath may be rejected by correctly modeling the multipath-based false observations. Observation residuals due to multipath are more positive than normal observation residuals, the distribution of a false observation can thus be modeled, for example, to be uniformly distributed on the negative side and linearly increasing on the positive side. Such a distribution is illustrated in FIG. 4 by PDF 401, for example. If the residual is negative with probability of 20% and positive with probability of 80%, the PDF for false observations may be provided by:

$$p_0 = \begin{cases} \dfrac{1}{5|\gamma S(k)|^{1/2}} & v(k) < 0 \\ \dfrac{1}{5|\gamma S(k)|^{1/2}} + \dfrac{6}{5} \dfrac{v(k)}{|\gamma S(k)|} & v(k) \geq 0 \end{cases}$$

Thus, when the GPS receiver is not sufficiently modeled by a single model, the IMM estimator allows the GPS receiver to be modeled by multiple models simultaneously. In addition, when there is a probability that some false observations may be incorporated in the GPS navigation calculations, a PDAF improves over a conventional Kalman filter. A possible application of an IMM estimator and PDAFs in GPS navigation is a dynamically changing environment in which a constant velocity model accurately describes the receiver's motion only a portion of the time, while one or more other models incorporating accelerations (e.g., acceleration, deceleration and turns).

Another example for the IMM estimator is a multipath environment in which the IMM estimator uses one model which does not incorporate multipath effects, and another model which incorporates multipath effects. When multipath effects are not present, the first model dominates and provides the navigation output most of the time. When multipath effects are present, the IMM estimator gives greater weight to the multipath model which has a large measurement variance, and may incorporate a multipath false measurement model in a PDAF. Conventional methods can not handle such a situation because multipath effects appear almost randomly.

Yet another example for an IMM estimator and PDAF filters is an environment with very low SNR and with false observations. When false observations are frequent due to a very low SNR, multipath effects, or other effects in a hostile environment to GPS navigation, the PDAF algorithm with some proper statistics models out perform conventional Kalman filters.

The above detailed description is provided to illustrate specific embodiments of the present invention and is not intended to be limiting. Numerous variations and modifications within the scope of the present invention are possible. The present invention is set forth in the following claims.

We claim:

1. A method for performing GPS navigation in a GPS receiver, comprising:
    providing a plurality of models of GPS navigation, each model characterized by a model state vector which is updated periodically;

providing for each model a corresponding probabilistic data association filter (PDAF) for deriving, for each periodic update, a current value for the corresponding model state vector based on a current observation made on parameters affecting the corresponding state vector, wherein each PDAF determines whether the current observation is a correct observation or a false observation such that each PDAF updates the corresponding model state vector if the current observation is a correct observation and does not update the corresponding model state vector if the current observation is a false observation; and applying an interacting multiple model (IMM) estimator to provide, for each period, a current value for a system state vector using the current values of the model state vectors for that period and their corresponding PDAFs.

2. A method as in claim 1, wherein each model state vectors includes one or more of the following variables: 3-dimensional position, 3-dimensional velocity, clock bias, and clock drift.

3. A method as in claim 1, where the current value of the system state vector is a weighted average of the current values of the model state vectors and wherein a set of mode probabilities are assigned as weights for the weighted average.

4. A method as in claim 3, wherein the IMM estimator calculates mixing probabilities for each model based on previous measurements made on the parameters.

5. A method as in claim 4, wherein for each cycle, prior to deriving the current values of the model state vectors in the filters, using the mixing probabilities, the IMM estimator calculates an initial valve for each model state vector by weighting the current model state vectors of the immediately previous cycle.

6. A method as in claim 4, using the current values of the model state vectors derived by the filters, the IMM estimator calculates the mixing probabilities for use in the next cycle, and the mode probabilities for providing the current value of the system state vector.

7. A method as in claim 1, wherein each PDAF applies a statistical difference between the correct observation and the false observation to derive the current value of the model state vector.

8. A method as in claim 7, wherein the statistical difference is expressed by a first probability density function for the correct observation, and a second probability density function for the false observation.

9. A method as in claim 8, wherein the first probability density function and the second probability density function are each a function of a distance in standard deviations between the current observation and its nominal value.

10. A method as in claim 8, wherein the first probability density function and the second probability density function are each a function of a measured value for the parameters affecting the model state vector.

11. A method as in claim 8, wherein the first probability density function comprises one of: a Gaussian distribution, a Rayleigh distribution or an exponential distribution.

12. A method as in claim 8, wherein the second probability density function comprises one of: a uniform distribution, a linear distribution, an exponential distribution, or a combination of a uniform distribution and a linear distribution.

13. A method as in claim 1, wherein one of the models pertains to multipath effects.

14. A method as in claim 1, wherein one of the models pertains to a signal-to-noise ratio.

15. A method as in claim 1, wherein one of the models pertains to a GPS receiver moving at constant velocity.

16. A method as in claim 1, wherein one of the models pertains to motions of non-constant velocities.

* * * * *